(12) United States Patent
Shonai et al.

(10) Patent No.: US 7,231,313 B2
(45) Date of Patent: Jun. 12, 2007

(54) METHOD OF CALCULATING COMPENSATION VALUE FOR ANGLE DETECTING SENSOR AND ANGLE DETECTING SENSOR USING THE METHOD

(75) Inventors: Yuichi Shonai, Miyagi-ken (JP); Kazuo Hasegawa, Miyagi-ken (JP); Kazuhiko Fujita, Miyagi-ken (JP); Ichiro Tokunaga, Miyagi-ken (JP)

(73) Assignee: Alps Electric Co., Ltd., Ota-Ku, Tokyo (JP)

( * ) Notice: Subject to any disclaimer, the term of this patent is extended or adjusted under 35 U.S.C. 154(b) by 0 days.

(21) Appl. No.: 11/298,883

(22) Filed: Dec. 8, 2005

(65) Prior Publication Data

US 2006/0136169 A1 Jun. 22, 2006

(30) Foreign Application Priority Data

Dec. 16, 2004 (JP) ............................. 2004-364512
Oct. 27, 2005 (JP) ............................. 2005-313044

(51) Int. Cl.
*G01P 3/00* (2006.01)
(52) U.S. Cl. ...................................................... 702/145
(58) Field of Classification Search ................. 702/145
See application file for complete search history.

(56) References Cited

U.S. PATENT DOCUMENTS

2005/0039572 A1* 2/2005 Friedmann .................... 74/661

FOREIGN PATENT DOCUMENTS

| JP | 2000-35470  | 2/2000  |
| JP | 2002-303536 | 10/2002 |
| JP | 2003-66127  | 3/2003  |
| JP | 2003-106866 | 4/2003  |

\* cited by examiner

*Primary Examiner*—John Barlow
*Assistant Examiner*—Aditya S. Bhat
(74) *Attorney, Agent, or Firm*—Beyer Weaver LLP (57) ABSTRACT

A method of calculating a compensation value for an angle detecting sensor including a sensor unit, a signal converting section, a signal adjusting section, an arithmetic operation section, a memory section, and a compensator includes a first step of generating two signals having a predetermined phase difference from a plurality of output signals; a second step of calculating a rotation angle of an object from the two signals as an output angle before compensation; and a third step of extracting a candidate signal having a minimum residual energy in the signal after removal as the compensation value when a plurality of candidate signals having the same period but different amplitudes has been removed from a total error signal included in the output angle before compensation.

10 Claims, 9 Drawing Sheets

FIG. 5
DETECTED PHASE ERROR $\Delta\phi_\alpha(=\phi_\alpha-\theta)$ (IF $\Delta\phi_\alpha=+5°$)

DETECTED DISTORTION ERROR $\Delta\phi_\beta(=\phi_\beta-\theta)$ (IF $\Delta\phi_\beta=5°$)

FIG. 8

TOTAL ERROR SIGNAL $\Delta\phi(=\Delta\phi_\alpha+\Delta\phi_\beta)$

FIG. 9

FIG. 10
PHASE COMPENSATION VALUE
AND FIRST CANDIDATE SIGNALS

FIG. 11

ERROR SIGNAL AFTER PHASE COMPENSATION

FIG. 12

DISTORTION COMPENSATION VALUE AND SECOND CANDIDATE SIGNALS

FIG. 13

ERROR SIGNAL AFTER PHASE AND DISTORTION COMPENSATION $\Delta\phi_{-\alpha-\beta}$

FIG. 14

GAIN COMPENSATION VALUE AND THIRD CANDIDATE SIGNALS

FIG. 15

ERROR SIGNAL AFTER PHASE, DISTORTION, AND GAIN COMPENSATION $\Delta\phi_{-\alpha-\beta-\gamma}$

FIG. 16

METHOD OF CALCULATING COMPENSATION VALUE FOR ANGLE DETECTING SENSOR AND ANGLE DETECTING SENSOR USING THE METHOD

BACKGROUND OF THE INVENTION

1. Field of the Invention

The present invention relates to a method of compensating for a rotation angle detected with a magnetoresistive element typified by a giant magnetoresistive (GMR) element and to an angle sensor using the compensation method. More particularly, the present invention relates to a method of calculating a compensation value for an angle detecting sensor, capable of improving the detection accuracy of a detected output angle even if error signals including a phase error and/or a distortion error are included in signals output from a magnetoresistive element, and to an angle detecting sensor using the method.

2. Description of the Related Art

An output angle of, for example, a steering wheel of an automobile is detected with a wheel that rotates in synchronization with a rotating member, such as the steering shaft, and with an angle detecting sensor. The sensor unit in the angle detecting sensor adopts magnetoresistive elements that sense magnetism to output an output signal. Related arts of angle detecting sensors using the magnetoresistive elements are disclosed in, for example, Japanese Unexamined Patent Application Publication Nos. 2002-303536, 2000-35470, 2003-106866, and 2003-66127 (Patent Documents 1 to 4).

Figure 16:
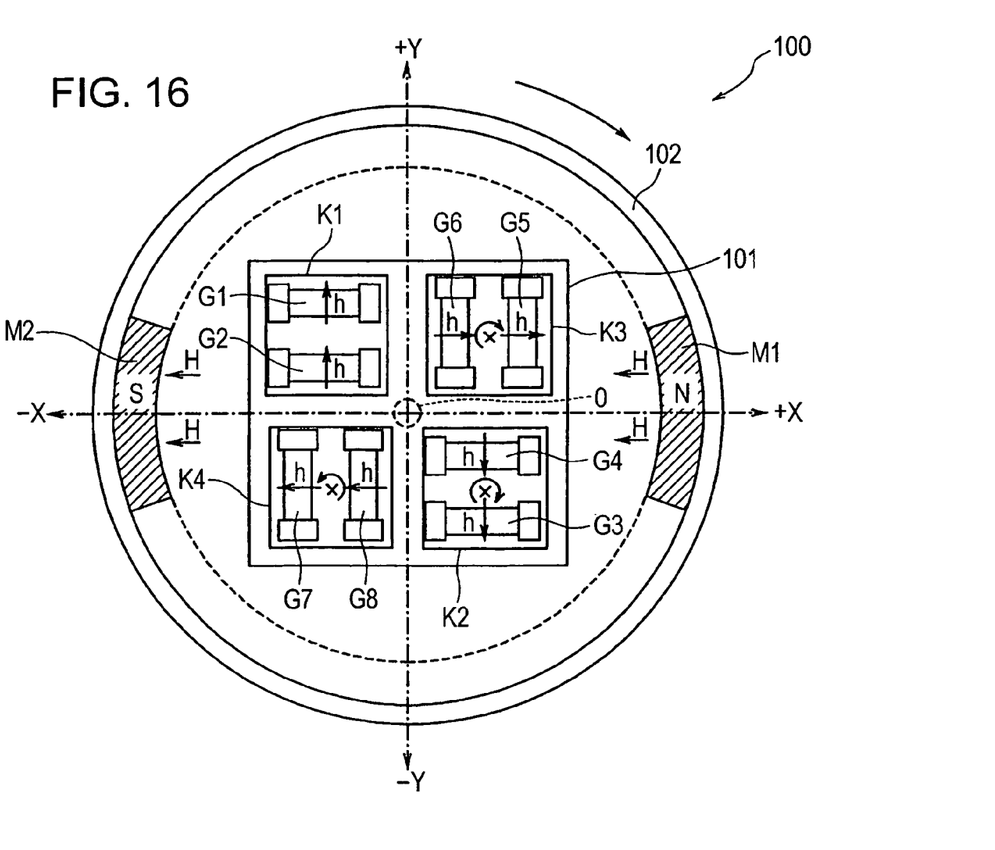
FIG. 16 is a plan view showing an example of the structure of an angle detecting sensor in a related art.

FIG. 16 is a plan view showing an example of the structure of an angle detecting sensor 100. The angle detecting sensor 100 has a wheel 102 that rotates about the center O of rotation and a package 101 provided inside the wheel 102.

The package 101 includes four chip substrates (wafers) K1, K2, K3, and K4 that are arranged symmetrically with respect the center O of rotation (arranged at positions shifted from each other by 90° around the center O of rotation). Each of the chip substrates K1 to K4 includes two GMR elements (denoted by G1 to G8) serving as magnetoresistive elements. Each GMR element basically has a structure in which an exchange bias layer (antiferromagnetic layer), a fixed layer (pinned layer), a non-magnetic layer, and a free layer (free magnetic layer) are layered.

Specifically, the chip substrate K1 includes the GMR elements G1 and G2, the chip substrate K2 includes the GMR elements G3 and G4, the chip substrate K3 includes the GMR elements G5 and G6, and the chip substrate K4 includes the GMR elements G7 and G8. Referring to FIG. 16, the GMR elements G1 and G4 connected in series to each other are connected in parallel to the GMR elements G3 and G2 connected in series to each other to form a first bridge circuit. Similarly, the GMR elements G5 and G8 connected in series to each other are connected in parallel to the GMR elements G7 and G6 connected in series to each other to form a second bridge circuit.

Magnets M1 and M2 are fixed inside the wheel 102. The magnet M1 is fixed in a state in which the north pole is directed to the center O of rotation and the magnet M2 is fixed in a state in which the south pole is directed to the center O of rotation. A predetermined external magnetic field H is generated between the magnets M1 and M2.

Rotation of the rotating member, which is an object to be measured, to rotate the wheel 102 causes the magnets M1 and M2 to circle around the package 101. At this moment, the direction of magnetization of the free layer of each of the GMR elements G1 to G8 is varied in accordance with the external magnetic field H. This variation varies the resistance of each of the GMR elements G1 to G8 in accordance with an angle between the direction of magnetization of the free layer and the direction of magnetization of the fixed layer. As a result, +sin and −sin signals are output from the first bridge circuit and, simultaneously, +cos and −cos signals are output from the second bridge circuit. The phases of the ±cos signals are shifted from those of the ±sin signals output from the first bridge circuit by 90°.

A controller differentially amplifies the +sin and ±sin signals, among the four signals, to generate a SIN signal (sinusoidal signal) and differentially amplifies the +cos and −cos signals to generate a COS signal (cosine signal). Then, the controller calculates a tangent (tan) from the SIN signal (sinusoidal signal) and the COS signal (cosine signal) and calculates an arctangent (arctan) in order to detect an output angle of the rotating member.

In order to detect the rotation angle of the rotating member with high accuracy in the angle detecting sensor 100, it is necessary to accurately maintain the phase difference 90° between the sinusoidal signal and the cosine signal. To this end, it is necessary to mount the chip substrates such that the directions h of magnetization of the adjacent chip substrates are accurately shifted from each other by 90° because the fixed layers of the two GMR elements provided on the same chip substrate have the same direction h of magnetization. For example, when the direction h of magnetization of the chip substrate K1 is +Y direction, the adjacent chip substrates are arranged such that the direction h of magnetization of the chip substrate K2 becomes −Y direction, the direction h of magnetization of the chip substrate K3 becomes +X direction, and the direction h of magnetization of the chip substrate K4 becomes −X direction.

However, since it is not possible to visually confirm the directions h of magnetization of the fixed layers of the GMR elements G1 to G8, it is difficult to mount the chip substrates K1 to K4 on the package 101 such that the directions h of magnetization of the chip substrates are accurately shifted from each other by 90°. If it is not possible to accurately set the shift to 90°, a phase error α occurs and the phase difference becomes 90°±α. Consequently, there is a problem in that the rotation angle (output angle) of the rotating member cannot be accurately detected.

When the chip substrates are accurately cut out and the directions h of magnetization of the GMR elements G1 to G8 are almost in parallel with sides of the chip substrates, an apparatus, for example, an image recognition apparatus, which compensates for the mounting angle can be used to mount the chip substrates on the package 101 such that the positions of the chip substrates are shifted from each other by 90° in order to accurately shift the directions h of magnetization by 90°. However, there are problems in that it is likely to increase the manufacturing cost of the chip substrates and that the assembly process becomes complicated to increase the assembly time and the assembly cost.

Figure 6:
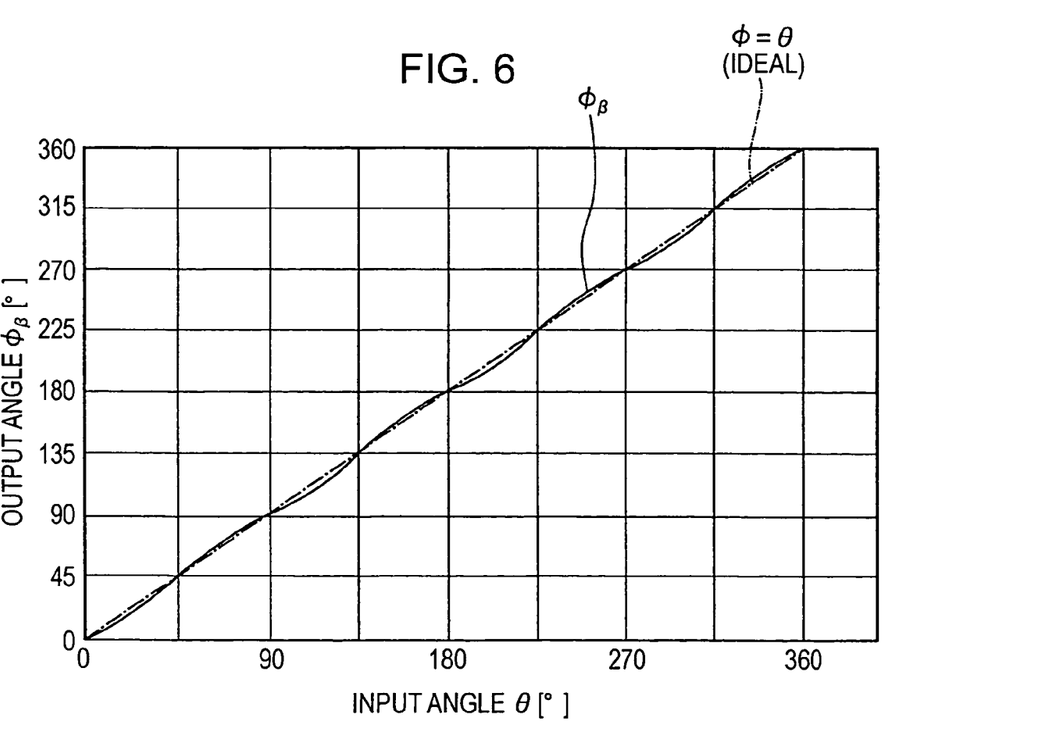
FIG. 6 is a waveform diagram showing the output angle $\phi_\alpha$ before compensation if a distortion error caused by resistance distortion is included.

Although it is desirable that an output angle φ be exactly proportional to an input angle (the rotation angle of the magnets) θ at which the wheel 102 rotates in the angle detecting sensor 100, the actual output angle φ ordinarily has a distortion error β resulting from superimposition of the sinusoidal signal on a straight line, which is a linear function, and there are cases in which the output angle φ is not exactly proportional to the input angle θ (refer to FIG. 6).

Such a distortion error β can be caused by resistance distortion specific to the GMR element. If the four signal waveforms output from the angle detecting sensor 100 include such distortion errors, the distortion errors also occur in the SIN and COS signals and the calculation of the tangent and the arctangent is also affected by the distortion errors. According, there is a problem in that it is not possible to improve the accuracy of the output angle φ detected by the angle detecting sensor 100.

The phase error α and the distortion error β can be approximated with a predetermined function, and the accuracy of the angle output can be greatly improved if the approximation function can be used to individually compensate for the output angle φ output from the angle detecting sensor 100. However, it is not easy to calculate compensation factors forming the predetermined function and there is no description of how to calculate the compensation factors in Patent Documents 1 to 4.

SUMMARY OF THE INVENTION

The present invention provides a method of calculating compensation values used for compensating for error signals including a phase error and/or a distortion error, included in the output from an angle detecting sensor.

The present invention also provides an angle detecting sensor that uses the compensation values calculated by the use of the method of calculating the compensation values to compensate for the error signals in order to improve the detection accuracy of an output angle.

According to an embodiment of the present invention, a method of calculating a compensation value for an angle detecting sensor including a sensor unit that generates a rotating magnetic field in accordance with rotation of an object to be measured and that detects the rotating magnetic field to output a plurality of output signals in accordance with an input angle of the rotation; a signal converting section that converts the plurality of output signals into two signals having a predetermined phase difference; a signal adjusting section that adjusts offsets and gains of the two signals; an arithmetic operation section that calculates a rotation angle of the object from the two signals after the adjustment as an output angle before compensation; a memory section in which the compensation value used for compensating for a total error signal included in the output angle before compensation is written in advance; and a compensator that removes the compensation value from the total error signal included in the output angle before compensation to calculate an output angle of the object includes a first step of generating the two signals having the predetermined phase difference from the plurality of output signals; a second step of calculating the rotation angle of the object from the two signals as the output angle before compensation; and a third step of extracting a candidate signal having a minimum residual energy in the signal after removal as the compensation value when a plurality of candidate signals having the same period but different amplitudes has been removed from the total error signal included in the output angle before compensation.

With the method of calculating the compensation value for the angle detecting sensor, it is possible to calculate an optimal compensation value used for compensating for the total error signal included in the output angle before compensation.

In the method of calculating the compensation value for the angle detecting sensor, the residual energy is calculated by the following equation:

$$E = \int_0^{2\pi} e^2 d\theta$$

where E denotes the residual energy, θ denotes the input angle, Δφ denotes the total error signal included in the output angle before compensation, $S_n$ (n is equal to α, β, or γ) denotes the compensation value, and e (=Δφ−$S_n$) denotes a component included in the signal after the compensation value $S_n$ is removed from the total error signal Δφ.

The above calculation can use a generalized harmonic analysis (GHA) to yield the compensation value (function) approximating the error signal in order to calculate an optimal compensation value.

In the method of calculating the compensation value for the angle detecting sensor, the compensation value is approximated with the following equation:

$$S_\alpha = \frac{\alpha}{2}\{1 + \cos 2\phi_\alpha\} \text{ where } \phi_\alpha = \arctan\left\{\frac{\sin(\theta + \alpha)}{\cos\theta}\right\}$$

and $S_\alpha$ denotes the compensation value when the phase difference between the two signals is equal to 90±α a given by adding a phase error ±α to a phase difference of 90°.

The above calculation can calculate, in advance, the phase compensation value $S_\alpha$ used for removing a detected phase error Δφ$_\alpha$ caused by the phase error a between the two signals.

In the method of calculating the compensation value for the angle detecting sensor, the compensation value is approximated with the following equation:

$$S_\beta = -\beta \cdot \sin 4\phi_\beta \text{ where } \phi_\beta = \arctan\left\{\frac{\sin\theta}{\cos\theta}\right\}$$

and $S_\beta$ denotes the compensation value corresponding to a distortion error β based on resistance distortion of the sensor unit.

The above calculation can calculate, in advance, the distortion compensation value $S_\beta$ used for removing a detected distortion error Δφ$_\beta$ caused by the distortion error β specific to the GMR element.

In the method of calculating the compensation value for the angle detecting sensor, the compensation value is approximated with an equation $S_\gamma$=γsin2θ, where $S_\gamma$ denotes the compensation value for a gain error having an amplitude γ.

The above calculation can calculate, in advance, the gain compensation value $S_\gamma$ used for removing a gain error signal Δφ$_\gamma$ caused by the gain error γ.

According to another embodiment of the present invention, an angle detecting sensor has the compensation value calculated by the method of calculating the compensation value described above in the memory section and compensates for the output angle of the object to be measured by the use of the compensation value read out from the memory section.

In the angle detecting sensor, it is possible to remove the compensation value, calculated in advance, from the output angle before compensation, calculated by the arithmetic operation section, to actually remove the error signals including the phase error and/or the distortion error, included in the output angle before compensation. Hence, the accuracy of the output angle detected by the angle detecting sensor can be improved.

At least one of the compensation values $S_\alpha$, $S_\beta$, and $S_\gamma$ is preferably written in the memory section.

Since part or all of the detected phase error $\Delta\phi_\alpha$, the detected distortion error $\Delta\phi_\beta$, and the gain error signal $\Delta\phi_\gamma$, included in the total error signal in the output angle before compensation, can be removed in the angle detecting sensor, the detection accuracy of the angle detecting sensor can be further improved.

The sensor unit preferably includes two pairs of bridge circuits formed of magnetoresistive elements.

The use of the magnetoresistive elements allows the angle detecting sensor to be reduced in size. In addition, the use of the bridge circuits can realize the sensor with a higher reliability.

It is preferable that the two signals be a SIN signal and a COS signal. An arctangent is preferably calculated after the arithmetic operation section calculates a tangent from the SIN signal and the COS signal to calculate the rotation angle of the object as the output angle before compensation.

The above calculation can accurately yield the rotation angle of the object.

The signal adjuster, the arithmetic operation section, and the compensator preferably form one arithmetic processing unit.

With this structure, the above calculations can be collectively performed under the control of the controller and the angle detecting sensor can be reduced in size.

According to the method of calculating the compensation value for the angle detecting sensor, it is possible to calculate, in advance, the compensation values used for compensating for the error signals including the phase error and/or the distortion error, included in the output angle before compensation.

In addition, it is possible to use the error signals calculated in advance to remove the error signals including the phase error and/or the distortion error, included in the output angle before compensation, so that the accuracy of the angle output of the angle detecting sensor can be improved.

DESCRIPTION OF THE PREFERRED EMBODIMENTS

Figure 1:
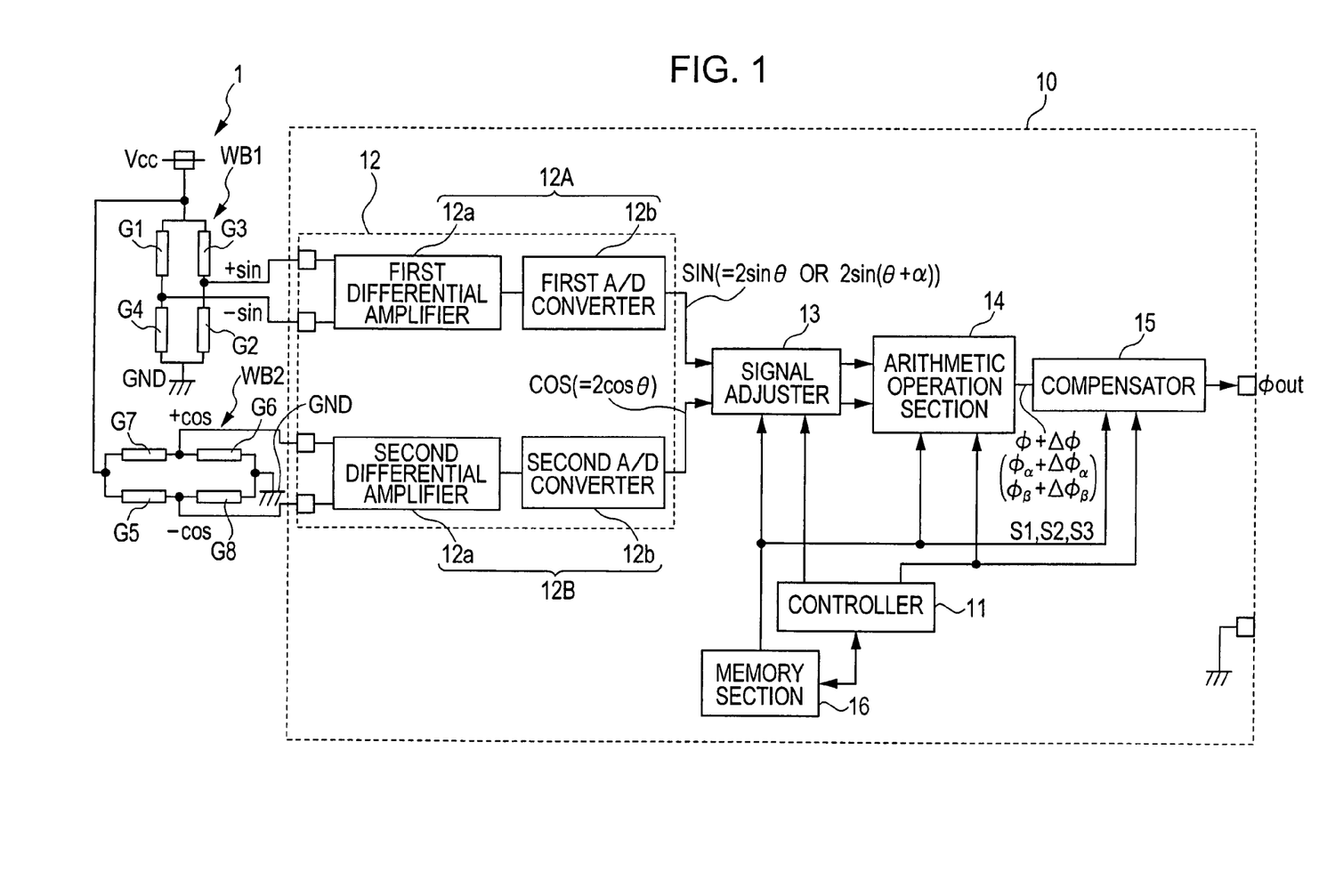
FIG. 1 is a block diagram showing an example of the structure of an angle detecting sensor according to an embodiment of the present invention.
Figure 2:
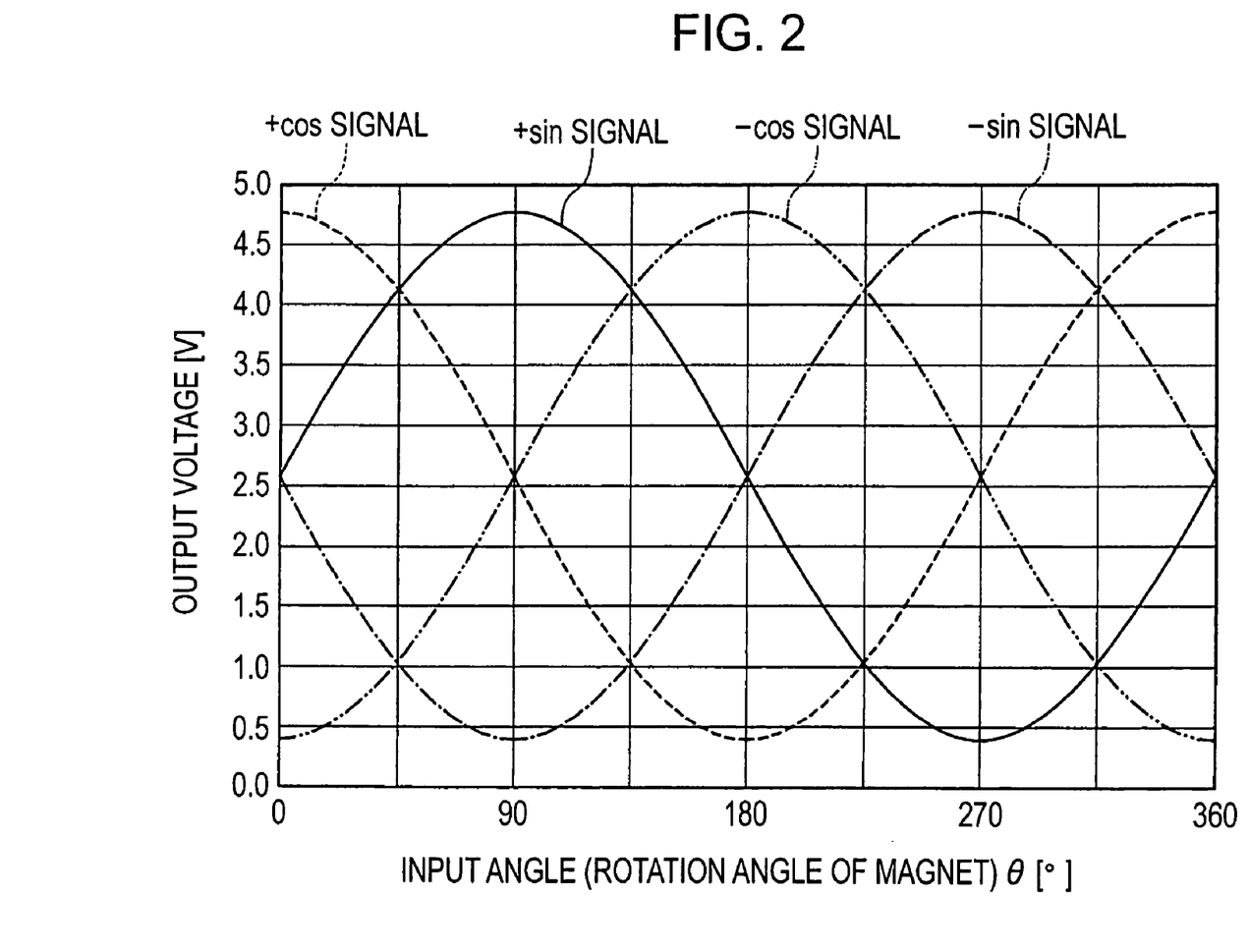
FIG. 2 is a waveform diagram in a case where four signals output from two pairs of bridge circuits have an ideal relationship.

FIG. 1 is a block diagram showing an example of the structure of an angle detecting sensor according to an embodiment of the present invention. FIG. 2 is a waveform diagram in a case where four signals output from two pairs of bridge circuits have an ideal relationship. The angle detecting sensor described below detects an output angle of a rotating member, such as the steering shaft of an automobile.

The angle detecting sensor shown in FIG. 1 includes a sensor unit 1 and a signal processing unit 10 that processes signals output from the sensor unit 1.

The sensor unit 1 has a structure similar to the structure described in "Description of the Related Art". Specifically, as shown in FIG. 16, the sensor unit 1 has a wheel 102 rotatably provided with respect to the center O of rotation and a package 101 that has four chip substrates (wafers) K1, K2, K3, and K4 mounted thereon and that is fixed inside the wheel 102. The four chip substrates K1, K2, K3, and K4 are provided symmetrically with respect to the center O of rotation in the package 101. In other words, the positions of the chip substrates K1 to K4 are shifted from each other by 90° around the center O of rotation.

Each of the chip substrates K1 to K4 includes two GMR elements serving as magnetoresistive elements. The eight GMR elements are denoted by G1 to G8. Each GMR element basically has a structure in which an exchange bias layer (antiferromagnetic layer), a fixed layer (pinned layer), a non-magnetic layer, and a free layer (free magnetic layer) are layered (not shown).

Since an external magnetic field is applied in a state where a plurality of GMR elements is formed on one large substrate and the large substrate is cut out into the individual chip substrates K1 to K4 after the directions of magnetization of the fixed layers are aligned with a predetermined direction, the fixed layers of the two GMR elements provided on one chip substrate has the same direction of magnetization. The chip substrates K1 to K4 are fixed inside the package 101 such that the directions of magnetization of the adjacent chip substrates are shifted from each other by about 90°. Although it is preferable that the positions of the adjacent chip substrates be shifted from each other by an exact 90-degree angle, the relationship of an exact 90-degree angle is not necessarily required because a phase error caused by a wrong relationship can be compensated for by a method described below.

Each of the GMR elements G1 to G8 mounted on the chip substrates K1 to K4 includes the two pairs of bridge circuits including a first bridge circuit WB1 and a second bridge circuit WB2. As shown in FIG. 1, the first bridge circuit WB1 includes the GMR elements G1 and G2 and the GMR elements G3 and G4 mounted on the chip substrate K1 and the chip substrate K2, respectively, which are arranged axisymmetrically with respect to the center O of rotation (refer to FIG. 16). In other words, the first bridge circuit WB1 includes a first circuit having the GMR elements G1 and G4 connected in series to each other and a second circuit having the GMR element G3 and G2 connected in series to each other. The first circuit is connected in parallel to the second circuit in the first bridge circuit WB1. Similarly, the second bridge circuit WB2 includes the GMR elements G5 and G6 and the GMR elements G7 and G8 mounted on the chip substrate K3 and the chip substrate K4, respectively, which are arranged axisymmetrically with respect to the center O of rotation. In other words, the second bridge circuit WB2 includes a first circuit having the GMR elements G5 and G8 connected in series to each other and a second circuit having the GMR element G7 and G6 connected in series to each other. The first circuit is connected in parallel to the second circuit in the second bridge circuit WB2.

One end of the first bridge circuit WB1 and one end of the second bridge circuit WB2 are connected to a power supply Vcc, and the other end of the first bridge circuit WB1 and the other end of the second bridge circuit WB2 are grounded.

The wheel 102 is linked to the rotating member (such as the steering shaft), which is an object to be measured, via gears or the like, and the wheel 102 rotates in accordance with rotation of the rotating member. Accordingly, the rotation of the rotating member rotates the wheel 102, so that magnets M1 and M2 fixed inside the wheel 102 circle around the package 101.

Since the external magnetic field H generated between the magnets M1 and M2 applies a rotating magnetic field to the GMR elements G1 to G8 in the package 101, the direction of magnetization of the free layer of each of the GMR elements G1 to G8 is varied. This variation varies the resistance of each of the GMR elements G1 to G8 in accordance with an angle between the direction of magnetization of the free layer and the direction of magnetization of the fixed layer. As a result, two sinusoidal signals whose phases are shifted from each other by 180° are output from the connection part between the GMR elements G3 and G2 and the connection part between the GMR elements G1 and G4 in the first bridge circuit WB1. Simultaneously, two sinusoidal signals whose phases are shifted from each other by 180° are also output from the connection part between the GMR elements G7 and G6 and the connection part between the GMR elements G5 and G8 in the second bridge circuit WB2.

However, since the chip substrates K1 and K2, which are arranged axisymmetrically with respect to the center O of rotation, are shifted from the chip substrates K3 and K4, which are arranged axisymmetrically with respect to the center O of rotation, with respect to the center O of rotation by about 90°, the two signals output from the second bridge circuit WB2 become a +cos signal and a −cos signal when the two signals output from the first bridge circuit WB1 are a +sin signal and a −sin signal (refer to FIG. 2).

As shown in this embodiment, when the sinusoidal signal output from the connection part between the GMR elements G3 and G2 in the first bridge circuit WB1 while the wheel 102 is rotating clockwise is the +sin signal, the −sin signal is output from the connection part between the GMR elements G1 and G4. At this time, the +cos signal is output from the connection part between the GMR elements G7 and G6 in the second bridge circuit WB2 and the −cos signal is output from the connection part between the GMR elements G5 and G8.

The signal processing unit 10 mainly includes a controller 11, a signal converting section 12, a signal adjuster 13, an arithmetic operation section 14, a compensator 15, and a memory section 16.

The controller 11 mainly includes a central processing unit (CPU) and controls a series of signal processing in the signal adjuster 13, the arithmetic operation section 14, the compensator 15, and so on.

The signal converting section 12 includes a first signal converting part 12A and a second signal converting part 12B. The first signal converting part 12A includes a first differential amplifier 12a and a first analog-digital (A/D) converter 12b. The second signal converting part 12B includes a second differential amplifier 12a and a second A/D converter 12b. In the first signal converting part 12A, the first differential amplifier 12a differentially amplifies the +sin signal and the −sin signal output from the first bridge circuit WB1 to generate a sin signal having a double amplitude, and the first A/D converter 12b converts the amplified signal in a predetermined sampling period into a SIN signal (digital signal).

Similarly, in the second signal converting part 12B, the second differential amplifier 12a differentially amplifies the +cos signal and the −cos signal output from the second bridge circuit WB2 to generate a cos signal having a double amplitude, and the second A/D converter 12b converts the amplified signal into a COS signal (digital signal) (a first process).

For example, when amplitude factors are denoted by A1, A2, B1, and B2, offset factors are denoted by a1, a2, b1, and b2, the +sin signal is denoted by $+A1 \cdot \sin\theta + a1$, the −sin signal is denoted by $-A2 \cdot \sin\theta - a2$, the +cos signal is denoted by $+B1 \cdot \cos\theta + b1$, and the −cos signal is denoted by $-B2 \cdot \cos\theta - b2$, the SIN signal generated in the first signal converting part 12A is given by an equation $(+A1 \cdot \sin\theta + a1) - (-A2 \cdot \sin\theta - a2) = (A1+A2) \cdot \sin\theta + (a1+a2)$ and, similarly, the COS signal generated in the second signal converting part 12B is given by an equation $(+B1 \cdot \cos\theta + b1) - (-B2 \cdot \cos\theta - b2) = (B1+B2) \cdot \cos\theta + (b1+b2)$.

The signal adjuster 13 performs offset adjustment and gain adjustment for the SIN signal and the COS signal to cause the SIN and COS signals to have the same reference point (zero point) in the direction of amplitude and the same amount (amount of amplitude). Specifically, in the above example, the gain adjustment means that the amplitude factor (A1+A2) of the SIN signal is made equal to or is approximated to the amplitude factor (B1+B2) of the COS signal. The offset adjustment means that a1+a2 is made equal to zero and b1+b2 is made equal to zero to adjust the reference point of the amplitude so as to coincide with the origin (zero point) in order to eliminate a shift due to the superimposition of a bias voltage.

These adjustments are performed by reading out a gain factor g satisfying, for example, $(A1+A2)=g \cdot (B1+B2)$ and offset factors gs and gc satisfying $(a1+a2)-gs=0$ and $(b1+b2)-gc=0$ from the memory section 16. Accordingly, the SIN signal approximately coincides with $(A1+A2) \cdot \sin\theta$ and the COS signal approximately coincides with $(B1+B2) \cdot \cos\theta$ (where, $A1+A2 \approx g \cdot (B1+B2)$).

The arithmetic operation section 14 installs software executing function calculations including sin, cos, tan, tan⁻

ı=arctan, sinh, cosh, exp, and log, and other calculations. For example, the arithmetic operation section 14 installs numerical calculation software using a known coordinate rotation digital computer (CORDIC) algorithm. In this example, the arithmetic operation section 14 performs TAN processing for calculating a tangent (tan=SIN signal/COS signal=sinθ/cosθ) by dividing the SIN signal by the COS signal and ATAN processing for calculating an arctangent (arctan (sinθ/cosθ)) from the value calculated in the TAN processing to yield an output angle φ[°] before compensation of the object to be measured.

The compensator 15 is a function calculating unit using the CORDIC algorithm similar to that in the arithmetic operation section 14, and performs arithmetic operations described below.

It is preferable that the signal adjuster 13, the arithmetic operation section 14, and the compensator 15 form one arithmetic processing unit. This is because the above calculations can be collectively performed in the arithmetic processing unit under the control of the controller 11 and the angle detecting sensor can be reduced in size.

The memory section 16 stores the gain factor g and the offset factors gs and gc, which are calculated in advance from data measured in an inspection process before shipment, and further stores compensation values including a phase compensation value $S_\alpha$, a distortion compensation value $S_\beta$, and a gain compensation value $S_\gamma$, described below, for every angle detecting sensor.

A method of calculating the compensation values will now be described.

Figure 3:
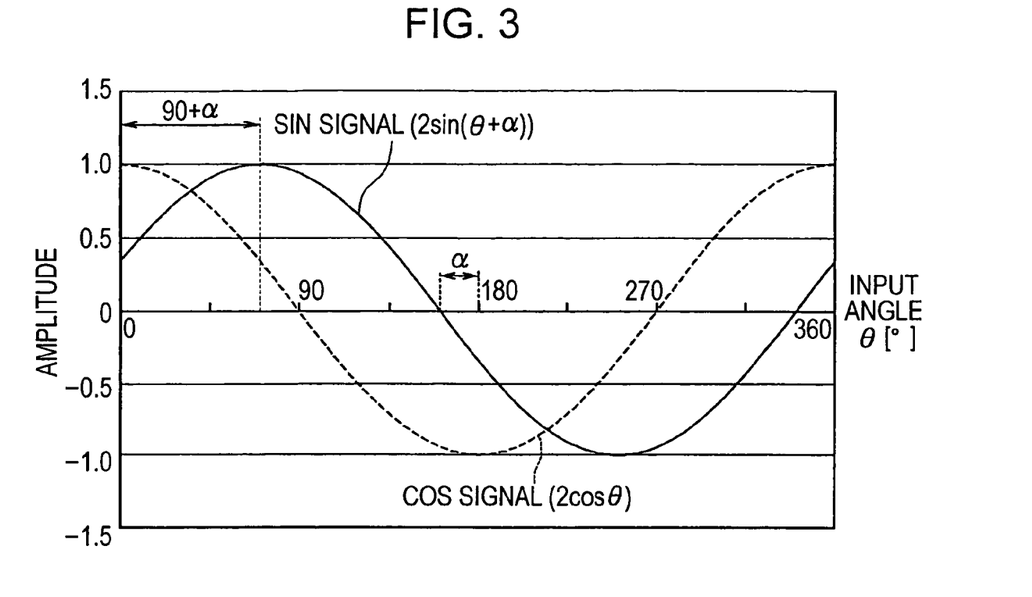
FIG. 3 is a waveform diagram in a case where a phase error occurs between a SIN signal and a COS signal output from the bridge circuits.

FIG. 3 is a waveform diagram in a case where a phase error occurs between the SIN signal and the COS signal output from the bridge circuits.

If the relationship of 90° is not maintained between the directions of magnetization of the fixed layers of the GMR elements G1 to G8 mounted on the chip substrates K1 to K4, the phase error based on the shift in the direction of magnetization occurs between the SIN signal and the COS signal output from the first signal converting part 12A and the second signal converting part 12B, respectively, in addition to the original phase difference (90°).

It is assumed here that the rotation angle of the wheel 102, that is, the input angle of the angle detecting sensor 100 is denoted by θ, the phase error (the amount of shift from the phase difference 90°) is denoted by α[°], and the +cos signal and the –cos signal output from the second bridge circuit WB2 are denoted by +cosθ and –cosθ, respectively. For descriptive purposes, it is also assumed that the amplitude factors A1, A2, B2, and B2 are equal to one and that the offset factors a1, a2, b1, and b2 are equal to zero. This assumption causes no problem because the above factors are cleared by the signal adjuster 13 and in the TAN processing.

First Process

In the first process, a SIN signal and a COS signal are calculated. On the basis of +cosθ and –cosθ output from the second bridge circuit WB2, the +sin signal and –sin signal output from the first bridge circuit WB1 are represented by +sin(θ+α) and –sin(θ+α), respectively. Accordingly, the SIN signal output from the first signal converting part 12A is yielded by an equation +sin(θ+α)–(–sin(θ+α))=2sin(θ+α) and the COS signal output from the second signal converting part 12B is yielded by an equation +cosθ–(–cosθ)=2cosθ. The SIN signal and the COS signal are shown in FIG. 3 (the first process). Referring to FIGS. 3 to 8, the phase error α is set to +5° (α=+5°).

The offset adjustment and the gain adjustment are performed for the SIN signal output from the first signal converting part 12A and the COS signal output from the second signal converting part 12B by the signal adjuster 13.

Second Process

In a second process, an output angle $\phi_\alpha$ before compensation is calculated. Specifically, the tangent (tan=SIN signal/COS signal) is given by an equation 2sin(θ+α)/2cosθ=sin(θ+α)/cosθ in the TAN processing in the arithmetic operation section 14. Furthermore, the arctangent (arctan) is calculated in the ATAN processing. When the output from the arithmetic operation section 14 if the phase error α occurs is represented as the output angle $\phi_\alpha$ before compensation of an object to be measured, the output angle $\phi_\alpha$ before compensation is calculated by an equation $\phi_\alpha$=arctan(sin(θ+α)/cosθ)) (the second process).

Figure 4:
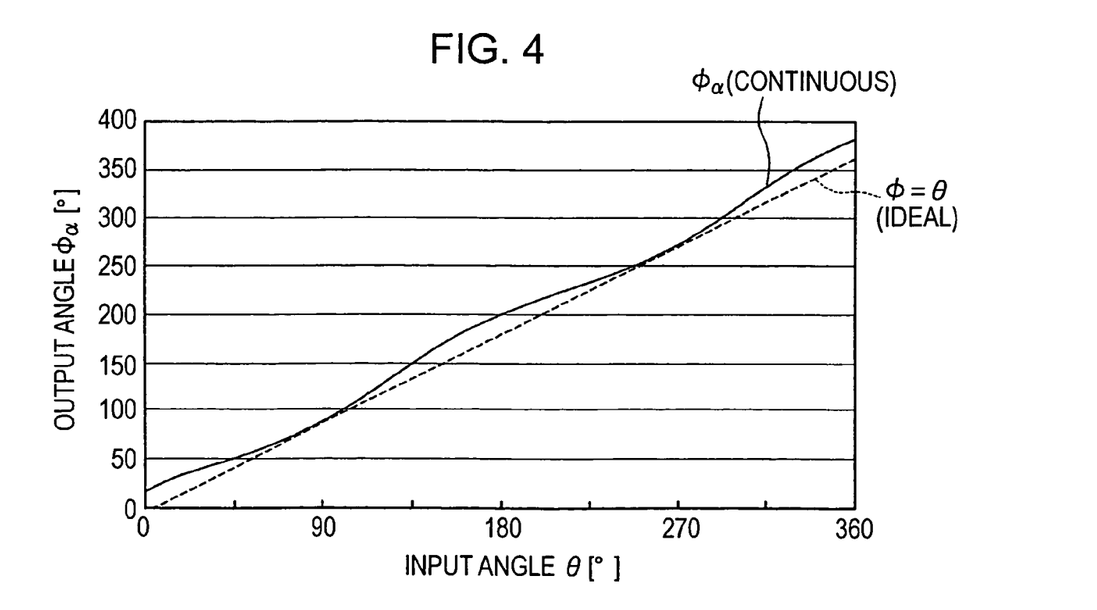
FIG. 4 is a waveform diagram in which an output angle $\phi_\alpha$ before compensation after ATAN processing is completed is represented by a continuous function.
Figure 5:
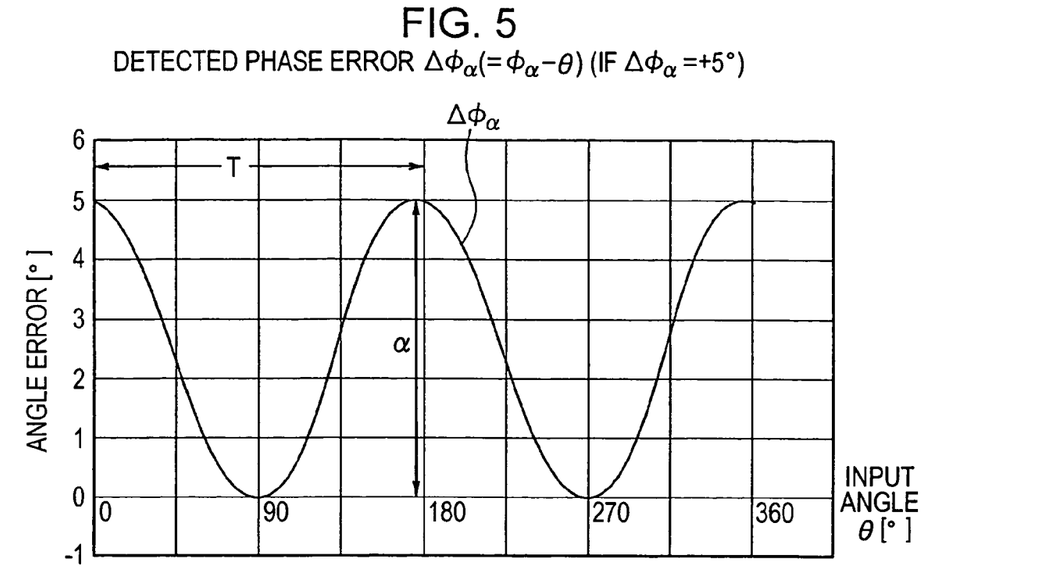
FIG. 5 is a waveform diagram in which the difference between the output angle $\phi_\alpha$ before compensation and an input angle $\theta$ is represented as a detected phase error $\Delta\phi_\alpha$ ($=\phi_\alpha-\theta$)

FIG. 4 is a waveform diagram in which the output angle $\phi_\alpha$ before compensation after the ATAN processing is completed is represented by a continuous function if the phase error occurs. FIG. 5 is a waveform diagram in which the difference between the output angle $\phi_\alpha$ before compensation and the input angle θ is represented as a detected phase error $\Delta\phi_\alpha$ (=$\phi_\alpha$–θ).

Referring to FIG. 4, the input angle θ per one rotation has one-to-one correspondence with the output angle $\phi_\alpha$ before compensation. However, the output angle $\phi_\alpha$ before compensation after the ATAN processing is completed is represented by a trigonometric function superimposed on a linear function (φ=θ), which is an ideal output angle.

The detected phase error $\Delta\phi_\alpha$, which is a phase difference (φ–θ) calculated by subtracting the input angle θ from the output angle $\phi_\alpha$ before compensation, is represented by a sinusoidal periodic function (trigonometric function), as shown in FIG. 5. In other words, the output angle $\phi_\alpha$ before compensation after the ATAN processing is completed includes the sinusoidal detected phase error $\Delta\phi_\alpha$ (=$\phi_\alpha$–θ) shown in FIG. 5.

Analysis of the detected phase error $\Delta\phi_\alpha$ shows that the four signals (the +sin signal, –sin signal, +cos signal, and –cos signal) or the SIN signal and the COS signal have a period T of 360° (refer to FIGS. 2 and 3) and that the detected phase error $\Delta\phi_\alpha$ has a period T of 180° (refer to FIG. 5). In other words, the detected phase error $\Delta\phi_\alpha$ is a trigonometric function having a frequency that is twice as high as that of basic signals, which corresponds to the four signals or the SIN signal and the COS signal (having a period that is half of that of the basic signals).

Accordingly, the detected phase error $\Delta\phi_\alpha$ can be approximated with a trigonometric function in Formula 1. A signal approximately showing the detected phase error $\Delta\phi_\alpha$ is referred to as the phase compensation value $S_\alpha$.

$$S_\alpha = \frac{\alpha}{2}\{1 + \cos 2\phi_\alpha\} \approx \Delta\phi_\alpha \text{ where} \quad \text{[Formula 1]}$$

$$\phi_\alpha = \arctan\left\{\frac{\sin(\theta+\alpha)}{\cos\theta}\right\}$$

The amount of a peak-to-peak amplitude of the phase compensation value $S_\alpha$ corresponds to the phase error α.

A method of calculating the distortion compensation value $S_\beta$ based on the resistance distortion of each GMR element will now be described.

Figure 7:
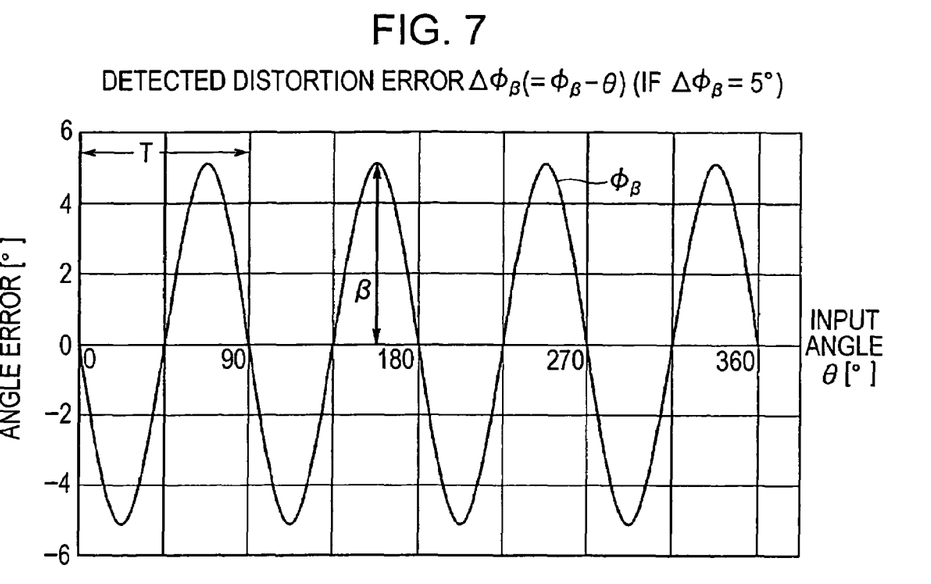
FIG. 7 is a waveform diagram showing a detected distortion error $\Delta\phi_\beta$ ($=\phi_\beta-\theta$)

FIG. 6 is a waveform diagram showing the output angle $\phi_\beta$ before compensation if the distortion error caused by the resistance distortion is included. FIG. 7 is a waveform diagram showing a detected distortion error $\Delta\phi_\beta$ ($=\phi_\beta-\theta$). A case in which the distortion error $\beta$ is equal to five degree ($\beta=5$) is shown in FIG. 7 as an example of the detected distortion error $\Delta\phi_\beta$.

The GMR elements G1 to G8 forming the first bridge circuit WB1 and the second bridge circuit WB2 each have the resistance distortion specific to the GMR elements. Hence, the four signals output from the first bridge circuit WB1 and the second bridge circuit WB2 each include the detected distortion error $\Delta\phi_\beta$ caused by the resistance distortion. The output angle $\phi_\beta$ before compensation, which is calculated by the use of the four signals including the detected distortion error $\Delta\phi_\beta$ by a method similar to the above method, that is, in the TAN processing and the ATAN processing, is represented by a sinusoidal error signal (distortion error) superimposed on a linear line ($\phi=\theta$) shown by an alternate long and short dashed line as an ideal output angle (refer to FIG. 6).

As in the phase error, the detected distortion error $\Delta\phi_\beta$, which is given by subtracting the linear function $\phi=\theta$ from the output angle $\phi_\beta$ before compensation ($\phi_\beta-\theta$) and which corresponds to a shift in angle between the output angle $\phi_\beta$ before compensation and the linear function $\phi=\theta$, is represented by a sinusoidal periodic function (trigonometric function), as shown in FIG. 7. In other words, the output angle $\phi_\beta$ before compensation after the ATAN processing is completed includes the sinusoidal detected distortion error $\Delta\phi_\beta$ ($=\phi_\beta-\theta$) shown in FIG. 7.

As in the detected phase error $\Delta\phi_\alpha$, analysis of the detected distortion error $\Delta\phi_\beta$ shows that the basic signals (the four signals or the SIN signal and the COS signal) have a period T of 360° and that the detected distortion error $\Delta\phi_\beta$ has a period T of 90° (refer to FIG. 7). In other words, the detected distortion error $\Delta\phi_\beta$ is a trigonometric function having a frequency that is four times as high as that of the basic signals (having a period that is a quarter of that of the basic signals). Accordingly, the detected distortion error $\Delta\phi_\beta$ can be approximated with a trigonometric function in Formula 2. A signal approximately showing the detected distortion error $\Delta\phi_\beta$ is referred to as the distortion compensation value $S_\beta$.

$$S_\beta = -\beta \cdot \sin 4\phi_\beta \approx \Delta\phi_\beta \quad \text{[Formula 2]}$$

where $\phi_\beta = \arctan(\sin\theta/\cos\theta)$

The amount of amplitude of the distortion compensation value $S_\beta$ corresponds to the phase error $\beta$.

Figure 8:
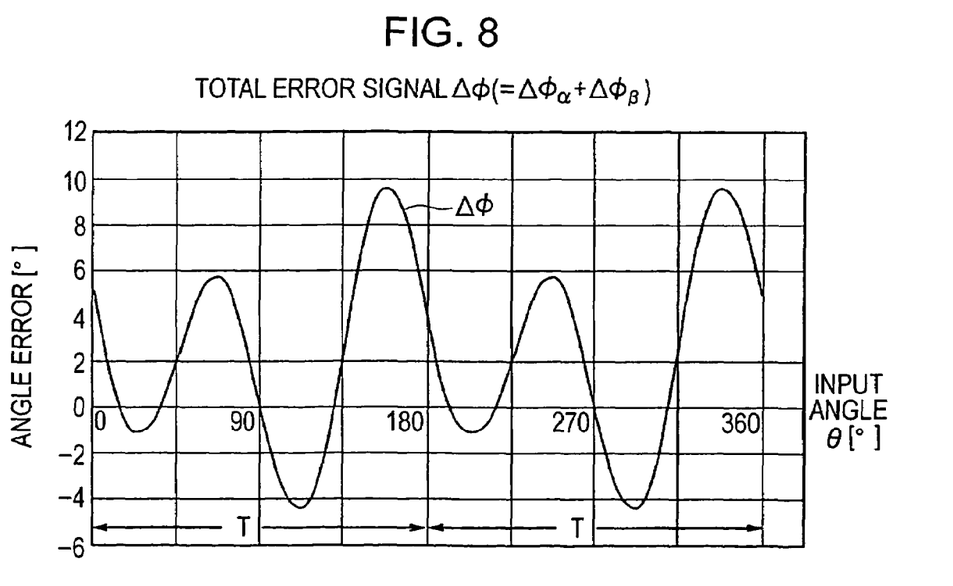
FIG. 8 is a waveform diagram showing an example of a total error signal $\Delta\phi$ ($=\Delta\phi_\alpha+\Delta\phi_\beta$)

FIG. 8 is a waveform diagram showing an example of a total error signal $\Delta\phi$ ($=\Delta\phi_\alpha+\Delta\phi_\beta$).

The output angle (output angle before compensation) $\phi$ of the arithmetic operation section 14 in the actual angle detecting sensor includes the two error signals, i.e., the detected phase error $\Delta\phi_\alpha$ and the detected distortion error $\Delta\phi_\beta$, mixed therein. An error signal including both the detected phase error $\Delta\phi_\alpha$ and the detected distortion error $\Delta\phi_\beta$ is referred to as the total error signal $\Delta\phi$ ($=\Delta\phi_\alpha+\Delta\phi_\beta$). The total error signal $\Delta\phi$ is formed of a periodic function having a period T of 180°, as shown in FIG. 8, and the output angle $\phi$ before compensation after the ATAN processing is completed includes the total error signal $\Delta\phi$.

Hence, if it is possible to remove the detected phase error $\Delta\phi_\alpha$ and the detected distortion error $\Delta\phi_\beta$ forming the total error signal $\Delta\phi$ from the output angle $\phi$ before compensation after the ATAN processing in the second process is completed, an angle output $\phi_{OUT}$ should be accurately calculated.

Although it has been proved that the detected phase error $\Delta\phi_\alpha$ can be approximated with the trigonometric function in Formula 1, having a frequency that is twice as high as that of the basic signals, and that the detected distortion error $\Delta\phi_\beta$ can be approximated with the trigonometric function in Formula 2, having a frequency that is four times as high as that of the basic signals, it is difficult to directly calculate the amplitudes ($\alpha/2$ and $\beta$) of the detected phase error $\Delta\phi_\alpha$ and the detected distortion error $\Delta\phi_\beta$ from the total error signal $\Delta\phi$ because the detected phase error $\Delta\phi_\alpha$ and the detected distortion error $\Delta\phi_\beta$ forming the total error signal $\Delta\phi$ in FIG. 8 are mixed.

Consequently, a third process of calculating the phase compensation value $S_\alpha$ and the distortion compensation value $S_\beta$ each having an appropriate amplitude, without directly calculating the amplitudes of the detected phase error $\Delta\phi_\alpha$ and the detected distortion error $\Delta\phi_\beta$, will now be described. The third process uses a generalized harmonic analysis (GHA).

Third Process

Figure 9:
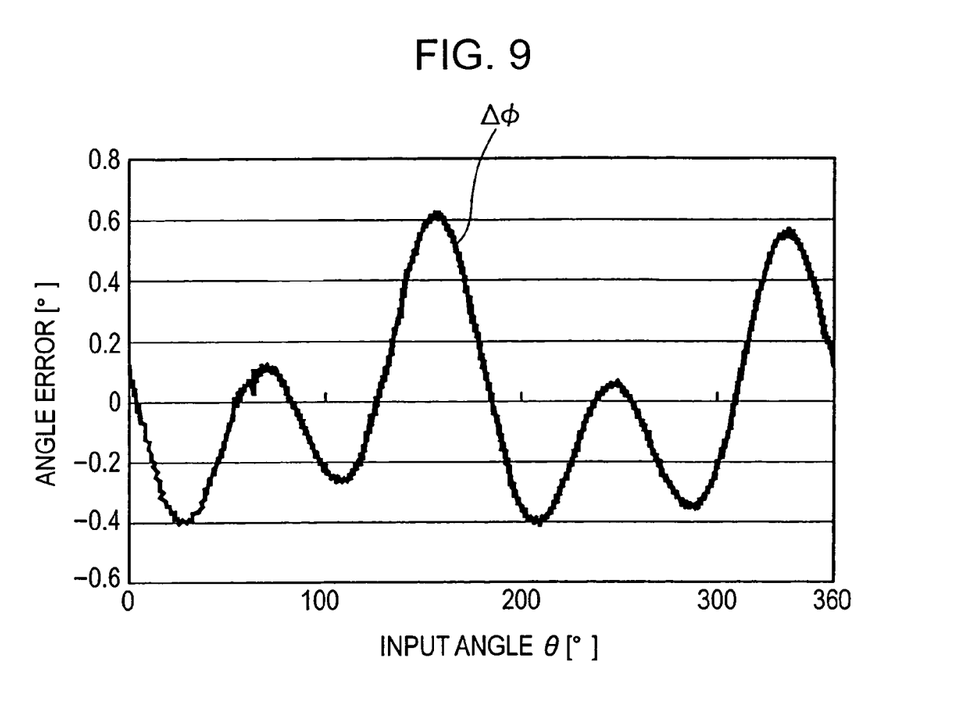
FIG. 9 is a waveform diagram showing another example of the total error signal $\Delta\phi$ included in the output angle $\phi$ before compensation.
Figure 10:
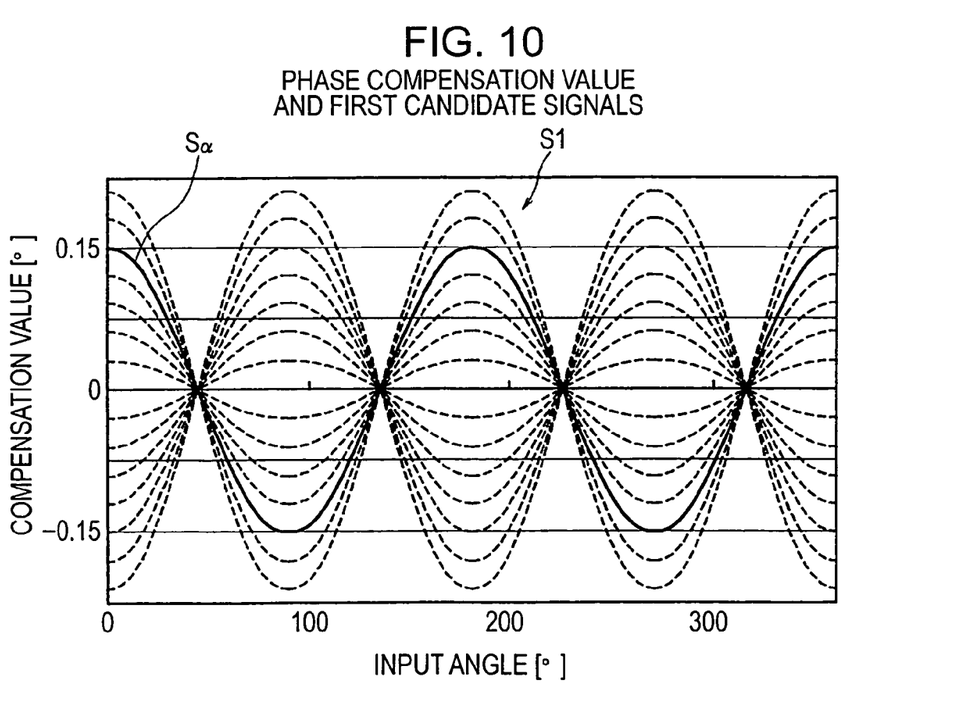
FIG. 10 is a waveform diagram showing a phase compensation value $S_\alpha$ and first candidate signals.
Figure 11:
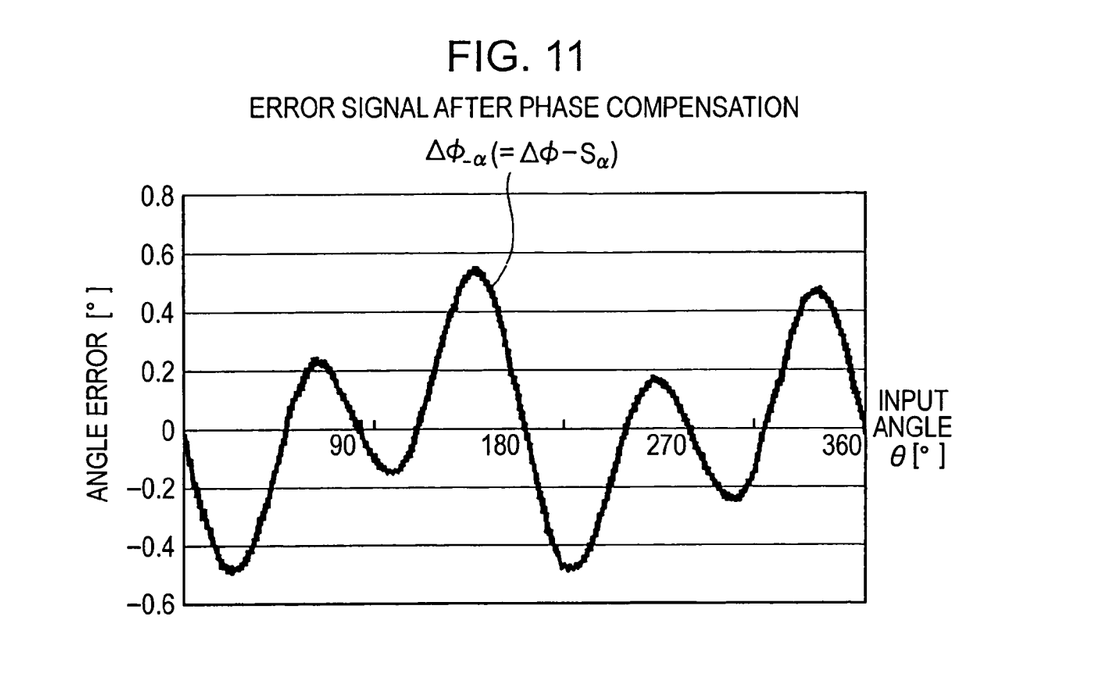
FIG. 11 is a waveform diagram showing an error signal $\Delta\phi_{-\alpha}$ ($=\Delta\phi-S_\alpha$) after phase compensation.
Figure 12:
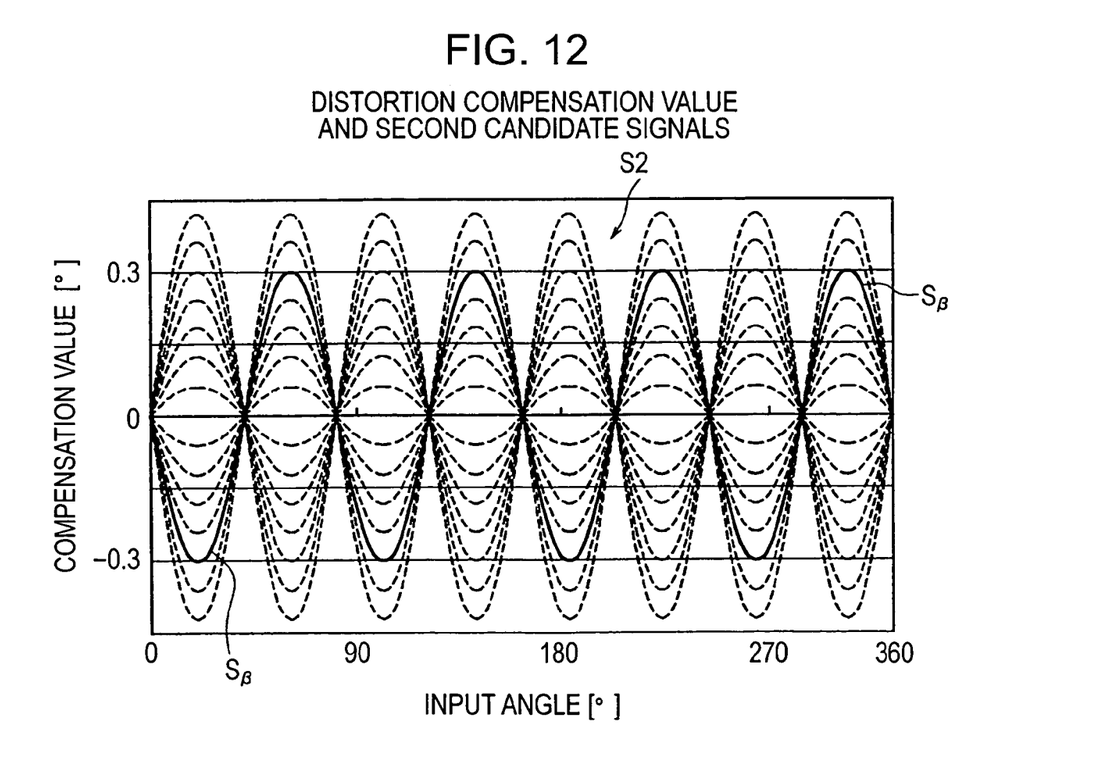
FIG. 12 is a waveform diagram showing a distortion compensation value $S_\beta$ and second candidate signals.
Figure 13:
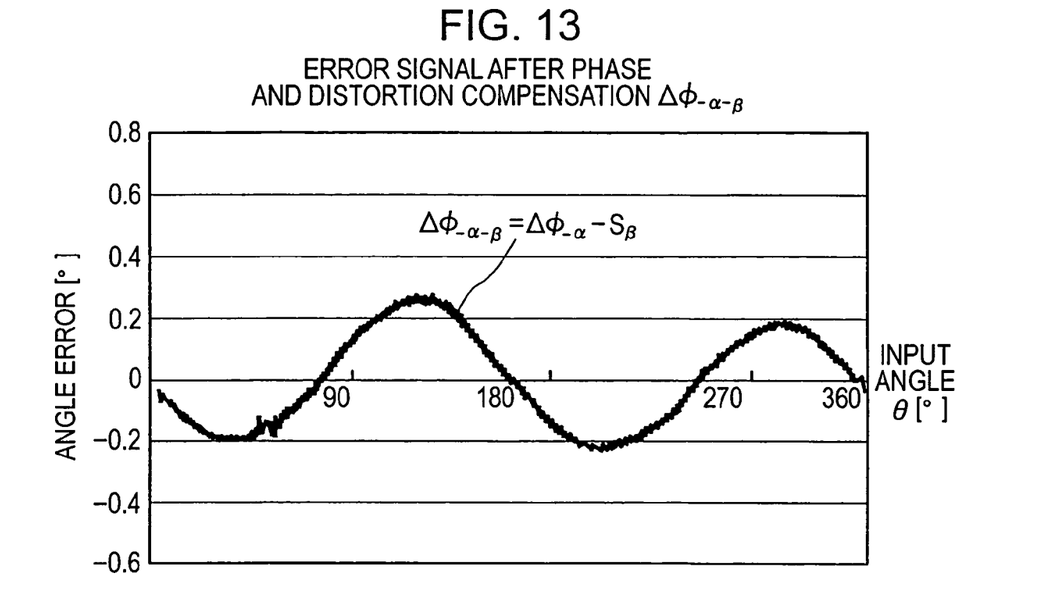
FIG. 13 is a waveform diagram showing an error signal $\Delta\phi_{-\alpha-\beta}$ ($=\Delta\phi_{-\alpha}-S_\beta$) after phase and distortion compensation.
Figure 14:
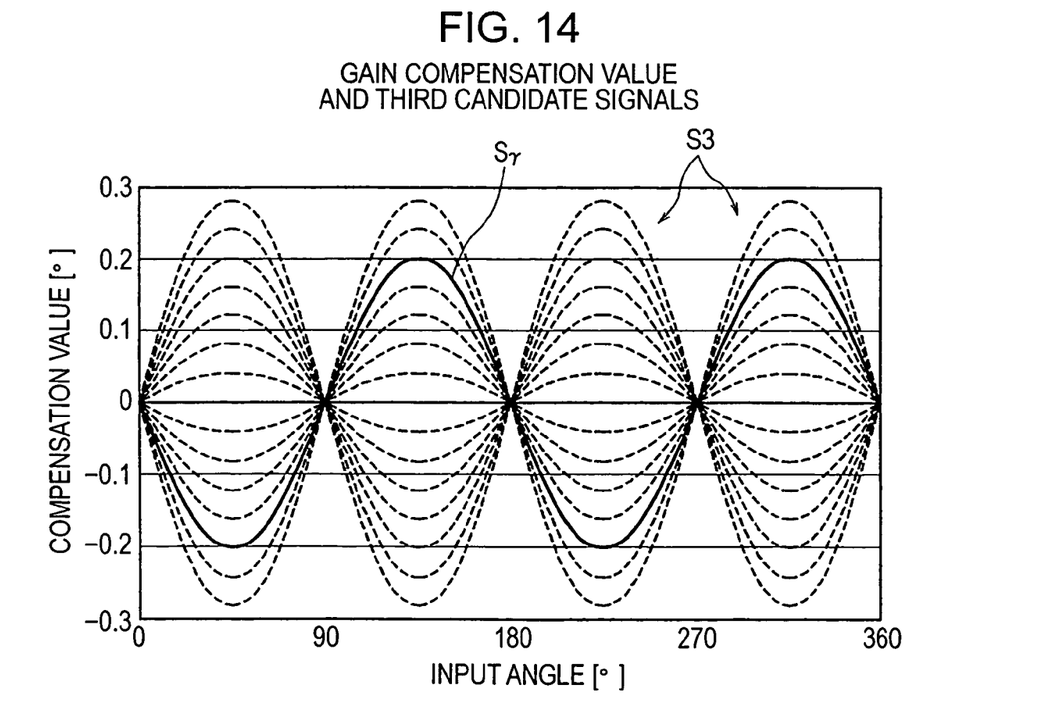
FIG. 14 is a waveform diagram showing a gain compensation value $S_\gamma$ and third candidate signals.
Figure 15:
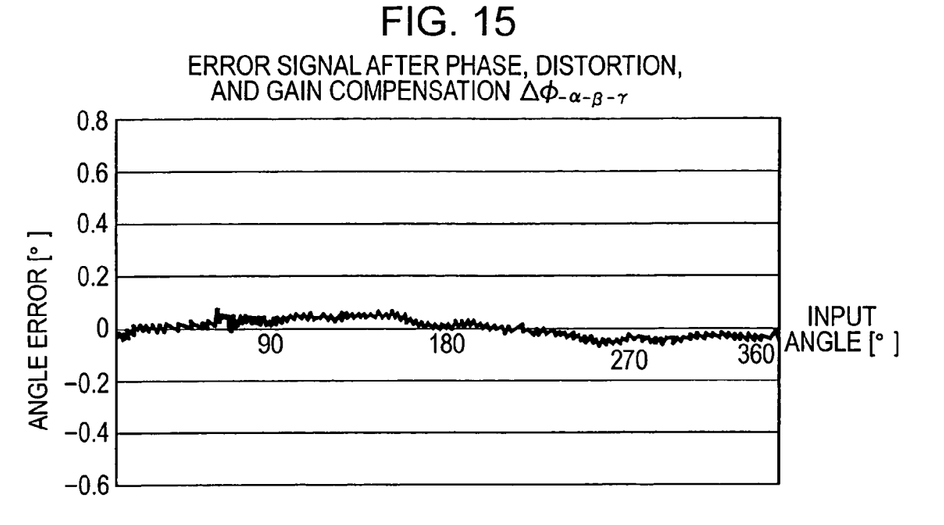
FIG. 15 is a waveform diagram showing an error signal $\Delta\phi_{-\alpha-\beta-\gamma}$ after phase, distortion, and gain compensation.

FIG. 9 is a waveform diagram showing another example of the total error signal $\Delta\phi$ included in the output angle $\phi$ before compensation. FIG. 10 is a waveform diagram showing the phase compensation value $S_\alpha$ and its candidate signals. FIG. 11 is a waveform diagram showing an error signal $\Delta\phi_{-\alpha}$ ($=\Delta\phi-S_\alpha$) after phase compensation. FIG. 12 is a waveform diagram showing the distortion compensation value $S_\beta$ and its candidate signals. FIG. 13 is a waveform diagram showing an error signal $\Delta\phi_{-\alpha-\beta}$ ($=\Delta\phi_{-\alpha}-S_\beta$) after phase and distortion compensation. FIG. 14 is a waveform diagram showing the gain compensation value $S_\gamma$ and its candidate signals. FIG. 15 is a waveform diagram showing an error signal $\Delta\phi_{-\alpha-\beta-\gamma}$ after phase, distortion, and gain compensation.

A case where the total error signal $\Delta\phi$, as shown in FIG. 9, is included in the output angle $\phi$ before compensation, calculated in the ATAN processing in the arithmetic operation section 14, will be described below.

(1) A Method of Calculating the Phase Compensation Value $S_\alpha$ Used for Compensating for the Detected Phase Error $\Delta\phi_\alpha$ First, a plurality of first candidate signals S1, as shown in FIG. 10, is prepared. The first candidate signals S1 are a collection of signals used for extracting the phase compensation value $S_\alpha$. Each of the first candidate signals S1 is calculated in Formula 1, that is, has a frequency that is twice as high as that of the basic signals including the SIN signal and the COS signal. However, the different first candidate signals S1 have different amounts of peak-to-peak amplitude (phase errors $\alpha$). The amount of data in each of the first candidate signals S1 corresponds to the amount of data in the total error signal $\Delta\phi$ in one period (360°).

The controller 11 extracts one optimal signal from the plurality of first candidate signals S1 as the phase compensation value $S_\alpha$. In other words, the controller 11 sequentially reads out the plurality of first candidate signals S1 and supplies the readout signals to the compensator 15.

A residual component e1, which is given by subtracting the readout first candidate signal S1 from the total error signal $\Delta\phi$, is represented by Formula 3.

$$e1 = \Delta\phi - S1 \quad \text{[Formula 3]}$$

The compensator 15 calculates a residual energy E1 based on Formula 4.

$$E1 = \int_0^{2\pi} e1^2 d\theta \quad \text{[Formula 4]}$$

The controller 11 compares the residual energy E1 output on the basis of Formulae 3 and 4 for every first candidate signal S1 to extract the first candidate signal S1 having a minimum residual energy E1 as an optimal phase compensation value $S_\alpha$.

Subtracting the extracted phase compensation value $S_\alpha$ from the total error signal $\Delta\phi$ gives the error signal $\Delta\phi_{-\alpha}$ ($=\Delta\phi-S_\alpha$) after phase compensation shown in FIG. 11. In the manner described above, the phase compensation value $S_\alpha$ (refer to FIG. 10) can be subtracted from the total error signal $\Delta\phi$ (refer to FIG. 9) to remove the detected phase error $\Delta\phi_\alpha$ (refer to FIG. 5) included in the total error signal $\Delta\phi$.

(2) A Method of Calculating the Distortion Compensation Value $S_\beta$ Used for Compensating for the Detected Distortion Error $\Delta\phi_\beta$ Next, a plurality of second candidate signals S2, as shown in FIG. 12, is prepared. The second candidate signals S2 are a collection of signals used for extracting the distortion compensation value $S_\beta$. Each of the second candidate signals S2 is calculated in Formula 2, that is, has a frequency that is four times as high as that of the basic signals including the SIN signal and the COS signal. However, the different second candidate signals S2 have different amounts of peak-to-peak amplitude (phase errors β). The amount of data in each of the second candidate signals S2 corresponds to the amount of data in the total error signal $\Delta\phi$ in one period (360°).

The controller 11 sequentially reads out the plurality of second candidate signals S2 and supplies the readout signals to the compensator 15.

A residual component e2, which is given by subtracting the readout second candidate signal S2 from the error signal $\Delta\phi_{-\alpha}$ after phase compensation, is represented by Formula 5.

$$e2=\Delta\phi_{-\alpha}-S2=\Delta\phi-S1-S2 \quad \text{[Formula 5]}$$

The compensator 15 calculates a residual energy E2 based on Formula 6.

$$E2 = \int_0^{2\pi} e2^2 d\theta \quad \text{[Formula 6]}$$

The controller 11 compares the residual energy E2 for every second candidate signal S2 to extract the second candidate signal S2 having a minimum residual energy E2 as an optimal distortion compensation value $S_\beta$.

Subtracting the extracted distortion compensation value $S_\beta$ from the error signal $\Delta\phi_{-\alpha}$ after phase compensation gives the error signal $\Delta\phi_{-\alpha-\beta}$ ($=\Delta\phi_{-\alpha}-S_\beta$) after phase and distortion compensation shown in FIG. 13. In the manner described above, the distortion compensation value $S_\beta$ (refer to FIG. 12) can be subtracted from the error signal $\Delta\phi_{-\alpha}$ after phase compensation (refer to FIG. 11) to remove the detected distortion error $\Delta\phi_\beta$ (refer to FIG. 7) included in the error signal $\Delta\phi_{-\alpha}$ after phase compensation. As shown in FIG. 13, the amount of error included in the error signal $\Delta\phi_{-\alpha-\beta}$ after phase and distortion compensation can be decreased.

However, the error signal $\Delta\phi_{-\alpha-\beta}$ after phase and distortion compensation shown in FIG. 13 includes a sinusoidal error signal $\Delta\phi_\gamma$. Analysis of the error signal $\Delta\phi_\gamma$ shows that the error signal $\Delta\phi_\gamma$ is a gain error signal $\Delta\phi_\gamma$ remaining after the gain adjustment performed in the signal adjuster 13. The gain error signal $\Delta\phi_\gamma$ is represented by Formula 7.

$$\Delta\phi_\gamma=\gamma\sin2\theta \quad \text{[Formula 7]}$$

where γ is an amplitude factor as a gain error. In the gain error signal $\Delta\phi_\gamma$ shown in FIG. 13, γ is about −0.2 (γ≈−0.2).

(3) A Method of Calculating the Gain Compensation Value $S_\gamma$ Used for Compensating for the Gain Error Signal $\Delta\phi_\gamma$ The gain error signal $\Delta\phi_\gamma$ can also be removed by a method similar to those for the detected phase error $\Delta\phi_\alpha$ and the detected distortion error $\Delta\phi_\beta$.

Specifically, a plurality of third candidate signals S3 (a collection of signals used for extracting the gain compensation value $S_\gamma$), as shown in FIG. 14, is prepared. A residual energy E3 is calculated for every third candidate signal S3 by integrating "e3²" in a range of one period (0 to 2 π[rad]). "e3²", is given by squaring a residual component e3 ($=\Delta\phi_{-\alpha-\beta}-S3$) resulting from subtraction of the third candidate signal S3 from the error signal $\Delta\phi_{-\alpha-\beta}$ after phase and distortion compensation. The third candidate signal S3 having a minimum residual energy E3 is extracted as an optimal gain compensation value $S_\gamma$ ($\approx\Delta\phi_\gamma$).

Subtracting the extracted gain compensation value $S_\gamma$ from the error signal $\Delta\phi_{-\alpha-\beta}$ after phase and distortion compensation gives the error signal $\Delta\phi_{-\alpha-\beta-\gamma}$ ($=\Delta\phi_{-\alpha-\beta}-S_\gamma$) after phase, distortion, and gain compensation shown in FIG. 15. In the manner described above, almost all the errors included in the output angle φ before compensation can be removed or can be approximated to zero.

As described above, according to the embodiments of the present invention, by the methods of calculating the compensation values described above, the first candidate signal S1 having the minimum residual energy E1 can be calculated from the multiple first candidate signals S1 as the phase compensation value $S_\alpha$ used for compensating for the detected phase error $\Delta\phi_\alpha$, the second candidate signal S2 having the minimum residual energy E2 can be calculated from the multiple second candidate signals S2 as the distortion compensation value $S_\beta$ used for compensating for the detected distortion error $\Delta\phi_\beta$, and the third candidate signal S3 having the minimum residual energy E3 can be calculated from the multiple third candidate signals S3 as the gain compensation value $S_\gamma$ used for compensating for the gain error signal $\Delta\phi_\gamma$.

At least one of the phase compensation value $S_\alpha$, the distortion compensation value $S_\beta$, and the gain compensation value $S_\gamma$, which are calculated by the above corresponding methods in advance, is written in the memory section 16 in the angle detecting sensor. Each time the angle output $\phi_{OUT}$ is output from the angle detecting sensor, at least one of the phase compensation value $S_\alpha$, the distortion compensation value $S_\beta$, and the gain compensation value $S_\gamma$ is read out from the memory section 16 to remove the detected phase error $\Delta\phi_\alpha$, the detected distortion error $\Delta\phi_\beta$, and/or the gain error signal $\Delta\phi_\gamma$ from the output angle φ before compensation.

This removal can weaken the effect of the error signals to improve the detection accuracy of the angle output $\phi_{OUT}$ output from the angle detecting sensor even if the four signals output from the magnetoresistive element include various error signals.

Repeating the third process can remove all the detected phase error $\Delta\phi_\alpha$, the detected distortion error $\Delta\phi_\beta$, and the gain error signal $\Delta\phi_\gamma$, and the detection accuracy of the angle output $\phi_{OUT}$ output from the angle detecting sensor can be improved.

Although the phase compensation value $S_\alpha$, the distortion compensation value $S_\beta$, and the gain compensation value $S_\gamma$ are calculated in this order in the methods of calculating the compensation values according to the embodiments of the present invention, the present invention is not limited to this order. The compensation values may be calculated in any order.

Although the detected phase error $\Delta\phi_\alpha$, the detected distortion error $\Delta\phi_\beta$, and the gain error signal $\Delta\phi_\gamma$ are removed in this order according to the embodiments of the present invention, the present invention is not limited to this order. The errors may be removed in any order. In addition, it is possible to remove errors of types other than the above types as long as the errors have the periodicity.

What is claimed is:

1. A method of calculating a compensation value for an angle detecting sensor including a sensor unit that generates a rotating magnetic field in accordance with rotation of an object to be measured and that detects the rotating magnetic field to output a plurality of output signals in accordance with an input angle of the rotation; a signal converting section that converts the plurality of output signals into two signals having a predetermined phase difference; a signal adjusting section that adjusts offsets and gains of the two signals; an arithmetic operation section that calculates a rotation angle of the object from the two signals after the adjustment as an output angle before compensation; a memory section in which the compensation value used for compensating for a total error signal included in the output angle before compensation is written in advance; and a compensator that removes the compensation value from the total error signal included in the output angle before compensation to calculate an output angle of the object, the method comprising:

generating the two signals having the predetermined phase difference from the plurality of output signals;

calculating the rotation angle of the object from the two signals as the output angle before compensation;

extracting a candidate signal having a minimiun residual energy in the signal after removal as the compensation value when a plurality of candidate signals having the same period but different amplitudes has been removed from the total error signal included in the output angle before compensation;

subtracting the candidate signal from the total error signal; and outputting the generated output angle to an external device, the output angle of the object based on the subtracted total error signal.

2. The method of calculating the compensation value for the angle detecting sensor, according to claim 1, wherein the residual energy is calculated by the following equation:

$$E = \int_0^{2\pi} e^2 d\theta$$

where E denotes the residual energy, $\theta$ denotes the input angle, $\Delta\phi$ denotes the total error signal included in the output angle before compensation, $S_n$ (n is equal to $\alpha$, $\beta$, or $\gamma$) denotes the compensation value, and e ($=\Delta\phi-S_n$) denotes a component included in the signal after the compensation value $S_n$ is removed from the total error signal $\Delta\phi$.

3. The method of calculating the compensation value for the angle detecting sensor, according to claim 2, wherein the compensation value is approximated with the following equation:

$$S_\alpha = \frac{\alpha}{2}\{1 + \cos 2\phi_\alpha\} \text{ where } \phi_\alpha = \arctan\left\{\frac{\sin(\theta+\alpha)}{\cos\theta}\right\}$$

and $S_\alpha$ denotes the compensation value when the phase difference between the two signals is equal to $90°\pm\alpha$ given by adding a phase error $\pm\alpha$ to a phase difference of $90°$.

4. The method of calculating the compensation value for the angle detecting sensor, according to claim 2, wherein the compensation value is approximated with the following equation:

$$S_\beta = -\beta \cdot \sin 4\phi_\beta \text{ where } \phi_\beta = \arctan\left\{\frac{\sin\theta}{\cos\theta}\right\}$$

and $S_\beta$ denotes the compensation value corresponding to a distortion error $\beta$ based on resistance distortion of the sensor unit.

5. The method of calculating the compensation value for the angle detecting sensor, according to claim 2, wherein the compensation value is approximated with an equation $S_\gamma = \gamma \sin 2\theta$, where $S_\gamma$ denotes the compensation value for a gain error having an amplitude $\gamma$.

6. An angle detecting sensor that has the compensation value calculated by the method of calculating the compensation value, according to claim 1, in the memory section and that compensates for the output angle of the object to be measured by the use of the compensation value read out from the memory section.

7. The angle detecting sensor according to claim 6, wherein at least one of compensation values $S_\alpha$, $S_\beta$, and $S_\gamma$ is written in the memory section.

8. The angle detecting sensor according to claim 6, wherein the sensor unit includes two pairs of bridge circuits formed of magnetoresistive elements.

9. The angle detecting sensor according to claim 6, wherein the two signals are a SIN signal and a COS signal, and wherein an arctangent is calculated after the arithmetic operation section calculates a tangent from the SIN signal and the COS signal to calculate the rotation angle of the object as the output angle before compensation.

10. The angle detecting sensor according to claim 6, wherein the signal adjuster, the arithmetic operation section, and the compensator form one arithmetic processing unit.

* * * * *